(12) United States Patent
Manning et al.

(10) Patent No.: US 7,019,954 B2
(45) Date of Patent: *Mar. 28, 2006

(54) UNIVERSAL SURGE PROTECTOR FOR NOTEBOOK COMPUTER

(75) Inventors: William R. Manning, Littleton, MA (US); Ronnie L. Bell, Nashua, NH (US); Clint D. Veino, Londonderry, NH (US)

(73) Assignee: American Power Conversion Corp., West Kingston, RI (US)

(*) Notice: Subject to any disclaimer, the term of this patent is extended or adjusted under 35 U.S.C. 154(b) by 299 days.

This patent is subject to a terminal disclaimer.

(21) Appl. No.: 10/404,870

(22) Filed: Apr. 1, 2003

(65) Prior Publication Data

US 2003/0202302 A1    Oct. 30, 2003

Related U.S. Application Data

(63) Continuation of application No. 09/601,228, filed on Sep. 15, 2000, now Pat. No. 6,556,410.

(51) Int. Cl.
*H02H 9/00* (2006.01)

(52) U.S. Cl. ..................... 361/111; 361/118
(58) Field of Classification Search ............. 361/18, 361/56, 58, 118, 127, 120, 115, 91.1, 111
See application file for complete search history.

(56) References Cited

U.S. PATENT DOCUMENTS

| | | | | |
|---|---|---|---|---|
| 4,907,118 A | * | 3/1990 | Hames | 361/56 |
| 5,835,326 A | * | 11/1998 | Callaway | 361/111 |
| 5,864,454 A | * | 1/1999 | Zaretsky | 361/127 |
| 6,556,410 B1 | * | 4/2003 | Manning et al. | 361/118 |

* cited by examiner

*Primary Examiner*—Stephen W. Jackson
(74) *Attorney, Agent, or Firm*—Mintz, Levin, Cohn, Ferris, Glovsky & Popeo, P.C.; Shane H. Hunter, Esq.

(57) ABSTRACT

A surge protector for portable personal computers, or notebooks, of the shunting type, employs two differently rated metal oxide varistors in a manner enabling operation with several differently rated AC power services. The surge protector is designed to provide an optimum effective clamping voltage with a low let-through voltage.

20 Claims, 2 Drawing Sheets

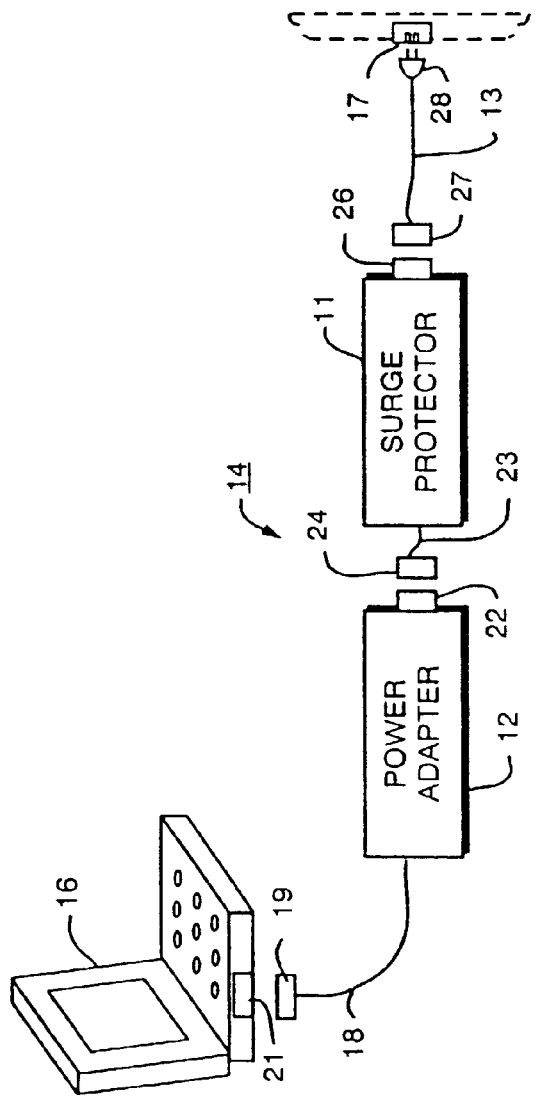
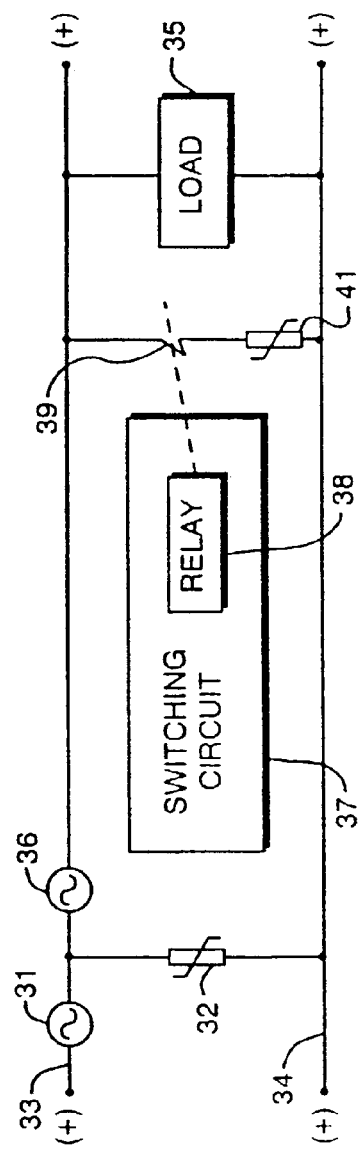
FIG. 1
FIG. 2

UNIVERSAL SURGE PROTECTOR FOR NOTEBOOK COMPUTER

CROSS-REFERENCE TO RELATED ACTIONS

This application is a continuation of National filing of U.S. application Ser. No. 09/601,228, filed Sep. 15, 2000 now U.S. Pat. No. 6,556,410, entitled Universal Surge Protector for Notebook Computers.

FIELD

The inventions presented herein relate to method and apparatus for diverting of harmful electrical voltage and current disturbances on alternating current ("AC") power lines supplying power to portable personal computers, hereinafter referred to as "notebook computers," a "notebook" or "notebooks."

BACKGROUND

Generally, manufacturers and/or re-sellers of notebook computers powered by a 16 volt direct current ("dc") battery, for example, make available to their customers a power adapter to produce a 16 volt dc output from different rated alternating current ("AC") power services available from public or private electric power utility companies. For example, a power adapter generates the 16 volt dc voltage to run a notebook from a 120 volt, 60 cycles per second ("cps") power service commonly available throughout the United States at a wall mounted outlet in most homes and places of business. In addition, the power adapter simultaneously re-charges the notebook's battery. The power adapters also produce the required 16 volt dc voltage from AC power sources used in other countries of the world including: A 100 VAC, 50 cps, rated service used in Japan; and a 240 volt 50 cps rated service used in Europe, Asia, the Middle East, South America and Africa.

It is known among manufacturers of notebooks to locate a power adapter inside the housing of a notebook. For brevity the following discussion is limited to power adapters which are external to the notebook housing. The housing for an external power adapter is generally rectangular in shape and about the size of a audio cassette tape. Characteristically power adapters include both AC and dc power cords. The dc power cord is anchored at one end to the power adapter and has a female dc plug at a free end for mating with a male dc receptacle mounted in the notebook housing. The AC power cord is a removable, specialized, electrical extension cord. The AC power cord has a two wire female AC plug at one end for mating with a male AC receptacle mounted in the housing of the power adapter and a two wire male AC plug at its other end for coupling to an AC power service at a standard female AC receptacle, wall mounted, for example.

Detachable AC power cords are available from or through notebook manufacturers. These AC power cords include the required male AC plug needed to fit the unique configuration of a female AC power receptacle of the AC power utility of a given country or region of the world. Consequently, an international traveler is advised to bring as many AC power cords having country specific AC plugs as required for mating with the unique mating connector of each power utility encountered on a multi-country trip.

An additional consideration for notebook computer owners is an electrical surge protector for notebooks to protect their notebooks from harmful electrical disturbances such as voltage and current transients which can damage a notebook. A damaged notebook normally means the owner looses the use of the notebook for getting productive work done. Harmful electrical disturbances occur on AC power lines for several well-known reasons including switching ON or OFF an electric motor or a circuit breaker carrying large electrical currents. Lightening strikes of AC power lines during electrical storms are another well-known cause for harmful electrical disturbances appearing on AC power lines.

Protection of notebooks from the foregoing and other harmful electrical disturbances is a concern to users of notebook computers regardless of the country or utility district in which a notebook is operated. In the United States. Underwriters Laboratories ("UL"), an electrical product safety standard setting and testing organization, provides criteria for evaluating the performance of surge protectors when coupled to a 120 VAC rated AC power service. Specifically the UL 1449 standard sets forth: (1) a let-through voltage criteria and (2) an effective clamping voltage criteria. Each test criteria is useful for evaluating the performance of surge protector equipment intended to guard notebook computers from harmful electrical AC line disturbances.

A main component of prior art surge protectors for use with notebooks coupled to a 120 volt rated AC power service is a metal oxide varistor ("MOV") or other voltage and current diverting and absorbing semiconductor devices, such as, transorbs and sidactors. A MOV is the diverting and absorbing semiconductor device used in the majority of prior art surge protectors to protect notebooks from harmful electrical disturbances. A typical prior art surge protector employs a single MOV in combination with a fuse to protect a notebook from harmful electrical disturbances.

Therefore, a first aspect of the present surge protector is to improve the performance of surge protectors for use with notebook computers by designing them to achieve an effective clamping voltage of 330 volt, while coupled to an AC power service rated from about 100 to about 120 volts, which is the best clamping voltage rating under the UL1449 standard.

Accordingly an important aspect of the present surge protector is to improve the level of protection for notebooks from harmful electrical disturbances over that achieved by prior art surge protectors while coupled to AC power services rated from about 100 to about 120 VAC which substantially achieves the UL 1449 standard 330 volt best clamping voltage and a low let-through voltage.

Another significant aspect of the present surge protector is the universal ability to protect a notebook from harmful electrical disturbances appearing on an AC power line in nearly every developed country and in many undeveloped countries, of the world.

Still another novel aspect of the present surge protector is that it employs two, differently rated, MOVs for protecting a notebook wherein a first, higher rated MOV protects a notebook while the surge protector is coupled to a high rated 240 VAC power service and a second, lower rated MOV protects the notebook while the surge protector is coupled to a lower rated AC power service of from about 100 to about 120 VAC.

Yet another aspect of this surge protector is that it includes a switch comprising a switching circuit which automatically connects a lower rated MOV across an AC power line when the AC power line is coupled to a lower rated AC power service and automatically disconnects the lower rated MOV from the AC power line when the AC power line is coupled to a higher voltage service leaving the higher rated MOV to protect a load, such as a notebook.

SUMMARY

The present surge protector overcomes the limitations of existing surge protectors used with notebooks to the benefit of international travelers who carry notebooks along with them into countries having different rated AC power utilities. As pointed out above, an important aspect of the present surge protector is the ability to use a single surge protector unit to protect a notebook in multiple countries each having differently rated AC power services or within one country having two or more differently rated AC power services. Specifically the present surge protector is operable to protect notebooks when they are coupled to either a high rated AC voltage source, such as 240 VAC. 50 or 60 cps. or a low rated AC voltage source, such as a 100 or 120 VAC. 50 or 60 cps AC power service. The surge protector offers protection for notebooks while coupled to AC power services rated from about 70 VAC to about 290 VAC.

The ability to protect notebooks when coupled to variously rated AC power sources is achieved by organizing the surge protector into two parts or sections. A first section of the surge protector includes a first MOV for protecting a notebook from electrical disturbances appearing on an AC power line coupled to a 240 volt AC power service. A second section, coupled in parallel with the first section, includes a second MOV for protecting a notebook from electrical disturbances appearing on an AC power line coupled to an AC power service rated from 100 to 120 VAC. Consequently, the single surge protector described herein is useable, for example, successively in Japan, the United States and Canada which offer low AC power services rated at 100 and 120 VAC, respectively, and in various European, Asian. African and South American countries which offer high AC power services rated at 240 VAC.

Both sections of the present surge protector are automatically selected to protect a power adapter and associated notebook when the AC power line is coupled to a low rated AC power source, for example, a 120 VAC rated AC power service. Only the first section of the surge protector is selected to protect the power adapter and notebook when the AC power line is coupled to a high rated AC power service, for example, a 240 VAC rated power service. A switch within the second section of the surge protector includes an electrical-mechanical relay which automatically connects the second MOV across an AC power line when the line is coupled to a low rated AC power service and automatically disconnects the MOV from the AC power line when the line is coupled to a high rated AC power service.

The two MOVs relay and other electrical components of the surge protector are mounted on a printed circuit board ("PCB") and are coupled to one another by conductive tracings on the PCB. The particulars of the surge protector circuits are given below.

The surge protector disclosed herein is contained in a small housing large enough to hold the above-described PCB and all the components carried by the PCB further including a male AC receptacle for mating with a female AC plug at one end of an AC power cord. Under normal operating conditions the housing is not noticeably warm to the touch when the surge protector is coupled to AC power services rated form 100 to 240 VAC.

THE DRAWINGS

The foregoing and other aspects of the disclosed surge protector will be apparent from a reading of the specification with reference to the drawings which are:

FIG. 1 is a schematic diagram of a portable personal computer, or notebook, showing the disclosed AC to dc voltage converter system, including a power adapter and a surge protector, ready to be coupled to a notebook and an AC power cord ready to be coupled to a wall mounted, female AC receptacle, representative of an AC power service.

FIG. 2 is an electrical circuit of a two part, or section, universal surge protector for protecting a notebook from electrical disturbances associated with power lines coupled to differently rated AC power services.

DETAILED DESCRIPTION

Figure 3:
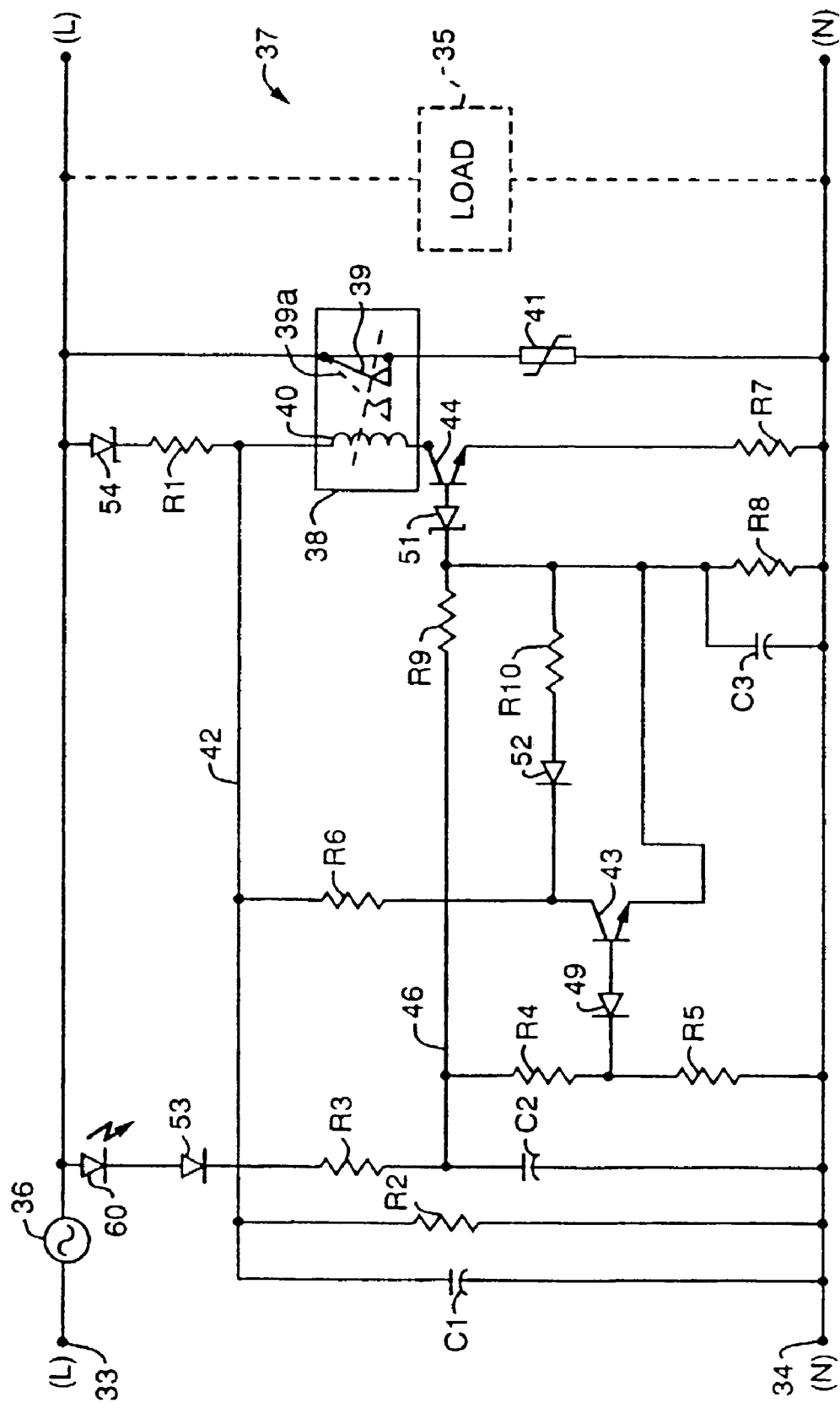
FIG. 3 is a circuit diagram of a switching circuit comprising the switch used in the second section of the two part surge protector of FIGS. 1 and 2 to connect and disconnect the second MOV to an AC power line.

With reference to FIG. 1, the universal power surge protector 11, the power adapter 12 and the AC power cord 13 comprise an AC to dc voltage converter system 14 for supplying a dc voltage to notebook computer 16 generated from an AC power source represented by the wall mounted female receptacle 17. The notebook 16 is representative of present day notebooks available from several manufacturers for example: IBM®, Compaq®, Dells®, Hewlett-Packard® and Apples® Computer and many others. Certain currently marketed notebooks are designed for portable operation from a dc 16 volt battery, for example, stored inside (and outside) the computer housing or are designed for a tethered, stationary operation from a dc 16 volt output, for example, generated by a power adapter from an AC power service available, by means of the proper AC power cord, at the wall mounted female receptacle 17.

A power adapter, typically includes a switching power supply that produces a fixed dc voltage output, 16 volts, for example, from several differently rated AC power services including those rated at 100, 120, 208 and 240 VAC, at 50 or 60 cps. The operation and design of switching power supplies used by power adapters intended for use with notebooks are well understood in the art. Detailed information on the design and operation of switching power supplies is available in data sheets and other product information obtainable from the above-identified notebook manufacturers or their re-sellers, the disclosures of which are hereby incorporated by reference.

Power adapter 12 includes a dc output cord 18 permanently connected at one end to a printed circuit board inside the power adapter housing and connected at a free end to a dc female plug 19 for mating with a recessed male dc receptacle 21 mounted within the housing of the notebook. A recessed two pin AC male receptacle 22 is mounted in the power adapter housing for coupling directly to an AC power line via an AC power cord 13 or through the surge protector 11 and its AC power cord 23.

The AC power cord 23 of the surge protector includes a female AC plug 24 at one end for mating with the male AC receptacle 22 of the power adapter. The other end of cord 23 is coupled to a printed circuit board ("PCB") within the surge protector housing. The surge protector also includes a two pin male AC receptacle 26 mounted within its housing. AC power cord 13 includes an AC female plug 27 at one end for mating with either the male AC receptacle 26 of the surge protector or the male AC receptacle 22 of the power adapter 12. The male AC plug 28 at the other end of cord 13 is configured to mate with a United States standard female AC power line receptacle 17, shown mounted in a wall of a room within an office building or home for example. Of course, a power cord 13 must include an appropriately configured male plug 28 for mating with the specific standard design of an AC power line receptacle employed in each country, or AC power service region, within which the user intends to use a notebook computer.

It should be apparent that female AC receptacles 22 and 26 mounted in the housings of the power adapter and surge protector respectively, are identical and that the female AC plug 24 at the free end of cord 23 is identical to female AC plug 27 at one end of AC power cord 13. Consequently, a power adapter can be coupled directly to an AC power source by power cord 13 when a surge protector is not available to protect a notebook from harmful electrical disturbances.

As stated above the surge protector includes the two sections shown in FIG. 2. The first section of the surge protector includes a slow acting fuse 31 and a first high voltage MOV 32 coupled in series and in parallel, respectively with the line 33 and neutral 34 sides of an AC power line. Slow acting fuse 31 protects the notebook the power adapter, and the surge protector, in particular MOV 32, from a sustained over current condition on AC power line 33 created, for example, by a short circuit occurring at any of the foregoing three devices. Fuse 31 protects the three devices by changing from an electrical conductor to an open circuit to disconnect and, thereby electrically isolate the notebook, power adapter and the surge protector from the AC power line under a short circuit condition existing in one of the three devices.

MOV 32 protects the power adapter and notebook against electrical voltage disturbances by diverting disturbances from the devices and by absorbing energy associated with the disturbances that, for example, exceed the maximum allowable voltage rating of MOV 32, which is 300 VAC. Absent large AC line disturbances, the impedance of MOV 32 is in the megohm range which effectively appears as an open circuit between the line 33 and neutral 34 sides of an AC power line coupled to a 240 VAC rated AC power service. MOV 32 switches to low impedance levels in response to large voltage disturbances appearing across the line 33 and neutral 34 sides of the AC power line. At the low impedance levels, MOV 32 diverts the electrical disturbances away from a notebook 16 and power adapter 12 and absorbs a portion of the energy associated with the disturbance.

The second section of surge protector 11 includes thermal fuse 36 and a second, lower rated MOV 41. Fuse 36 is selected for specifications which are compatible with MOV 41 in order to disconnect the surge protector, power adapter and notebook from the AC power line in the event MOV 41 goes into a thermal run-a-way condition in response to a significant sustained electrical disturbance.

The second section of the surge protector also includes a switching circuit 37 for adding or connecting and removing or disconnecting MOV 41 across the line 33 and neutral 34 sides of the AC power line. The switching circuit includes an electro-mechanical relay 38 which has a coil and a moveable conductive arm. The moveable arm is in an open circuit position when the relay coil is not energized and is in a closed circuit position when the coil is energized. Consequently, MOV 41 is coupled across the line 33 and neutral 34 sides of an AC power line when the relay coil of relay 38 is energized, and is disconnected from the AC power line when the relay coil of relay 38 is not energized. The switching circuit 37 energizes the relay coil to couple MOV 41 across the AC power line while the AC power line is coupled to a 100 to 120 VAC rated power service. The switching circuit prevents, that is, inhibits, the energizing of the relay coil of relay 38 while the AC power line is coupled to a 240 VAC rated AC power service.

Turning to FIG. 3, MOV 41 is coupled between the line 33 and neutral 34 sides of an AC power line when the moveable contact switch arm 39 of relay 38 is at the closed circuit arm position represented by solid line 39. The relay arm is at the closed circuit position while the coil 40 of relay 38 is energized from a 100 to a 120 VAC rated AC power service. The moveable contact arm moves to and stays at the closed circuit position 39 while transistor 44 is turned ON, enabling current to flow through relay coil 40. While transistor 44 is OFF, no current flows through relay coil 40 and the relay arm moves to its open circuit position represented by relay arm 39 A, shown with a dashed line. With arm 39 at the open circuit position MOV 41 is disconnected from across the AC power line.

Relay coil 40 is automatically energized by transistor 44 when the surge protect is coupled to an AC power service rated from 100 to 120 VAC. Transistor 44 is prevented from being turned ON by transistor 43 when the surge protector is coupled to an AC rated power service rated at 240 VAC.

The switching of transistor 44 ON and OFF occurs as follows. The collector electrodes of transistors 43 and 44 are coupled to the dc voltage on the first dc bus or rail 42. The rail voltage is, substantially a steady state voltage to which capacitor C1 is charged by diode 54, a half wave voltage rectifier coupled between the line 33 and neutral 34 sides of the AC power line by resistors R1 and R2 and capacitor C1. The voltage on rail 42 is coupled to the collector of transistor 44 through relay coil 40 and is coupled to the collector of transistor 43 through resistor R6. The emitter electrodes of transistors 43 and 44 are at a voltage potential slightly above that of the neutral side 34 of the AC power line to which the emitter of both transistors are coupled through resistor R7.

The base electrodes of transistors 43 and 44 are coupled to a second dc rail 46. The voltage of rail 46 is substantially, the steady state voltage to which capacitor C2 is charged by half wave voltage rectifier diode 53 coupled between the line 33 and neutral 34 sides of the AC power line, by resistor R3 and capacitor C2 and by resistors R3, R4, R5, R8 and R9. Resistors R4 and R5 establish a fixed bias to the cathode of zener diode 49 and resistors R7 and R8 establish a fixed bias to the cathode of zener diode 51.

The automatic switch or switching circuit 37 operates as follows when coupled to a 100 to 120 VAC rated power service: at 100 or 120 VAC, the dc potential on rail 46 is not adequate to bias the base of transistor 43, through zener diode 49, to turn ON transistor 43. However, the dc potential on rail 46 is adequate to bias the base of transistor 44, through zener diode 51, to turn transistor 44 ON. With transistor 44 ON, current flows through the relay coil 40, causing the relay arm 39 to move from its normally open circuit position represented by arm 39A to the closed circuit position represented by arm 39. Upon arm 39 moving to its closed circuit position. MOV 41 is connected across the line 33 and neutral 34 sides of the AC power line to protect the load 35 from harmful electrical disturbances as long as the AC power line is coupled to a 100 to 120 VAC rated AC power service. Typically, load 35 comprises a power adapter 12 coupled to a notebook 16 or another load type.

Energizing relay coil 40 to connect MOV 41 across the load 35 when the surge protector is coupled to a 100 to 120 VAC rated AC power service is preferred to energizing coil 40 when the surge protector is coupled to a 240 VAC rated power service. The reason is that the 240 VAC approach results in an inefficient use of energy and makes it more difficult to dissipate heat generated in the electrical components of the surge protector.

The automatic switching circuit or switch 37 operates as follows when coupled to a 240 VAC rated AC power service: the dc potential on rail 46 is adequate to bias the base electrodes of both transistors 43 and 44 through the above noted resistors and zener diodes to turn ON both of the transistors. However, transistor 43 is turned ON first in time and, once ON, prevents or disables transistor 44 from turning ON. Transistor 43 is turned ON before transistor 44 because the time required to charge capacitor C3 to the voltage level at which zener diode 51 conducts, turning ON transistor 44, is longer than the time required for zener diode 49 to conduct and bias ON transistor 43. With transistor 43 turned ON and transistor 44 OFF, the potential at the collector of transistor 43 is only slightly above that of neutral 34. This low voltage is coupled from the collector of transistor 43 through diode 52 and resistor R10 to the cathode of zener diode 51 preventing the zener diode from conducting and turning transistor 44 ON. With transistor 43 ON, transistor 44 stays OFF and no current flows through relax coil 40 causing the relay arm to remain at the open circuit position represented by relay arm 39A. Consequently MOV 41 is not connected across the line 33 and neutral sides 34 of the AC power line. At this time MOV 32 in the first section of the surge protector protects the notebook by diverting harmful electrical disturbances from a notebook and absorbing portions of the energy of the disturbance.

In one embodiment resistor R2 and capacitor C1 are implemented in a three level ladder network with the capacitance of capacitor C1 comprising the combined capacitance of three series connected capacitors. The resistance of resistor R2 is the combined resistance of three series connected resistors. Each end of the three resistors and three capacitors are electrically coupled together to form the ladder network. The ladder network enables the voltage drop across each of the capacitors to be evenly distributed making the voltage on rail 42 more stable.

Also, in the foregoing embodiment, resistors R1, R3 and R6 are each implemented as three separate series connected resistors. The use of multiple series resistors in place of one enables $I^2R$ producing heat created in the resistors while coupled to an AC power service to be dissipated over a larger resistor surface area and over a wider area on the PCB carrying the resistor and other circuit components of surge protector 12.

The division of the specific identified resistors of FIG. 3 into separate resistors increases the total resistance surface area for dissipating heat. Locating the multiple resistors at spaced locations over the surface of the PCB avoids hot spots and helps lower the temperature on the outside of the surge protector housing. The outside surface temperature of the surge protector housing is near that of the ambient temperature when the surge protector is coupled form a AC power service rated from about 100 to about 240 VAC.

The surge protector, while coupled to a 120 VAC rated power service achieved an effective clamping voltage of 330 volts which is the UL1449 standard best rating when tested with a 6000 V. 500 amp, 100 kHz. Catagory A combined surge, defined by American National Standards Institute ("ANSI") procedure C62.41. In addition the present surge protector achieved a let-through voltage of 161 VAC when subjected to a 6000 V. 200 amp 100 kHz. Category A ringwave test. The let-through voltage is the difference between the clamping voltage and the standard peak voltage of 169 for a 120 VAC rated power service.

The values of the resistors and capacitors and the identity of the transistors and the MOVs employed in surge protector 12 are listed in TABLE 1 below. Light emitting diode ("LED") 60 shown in FIG. 3 emits a green light whenever the surge protector is coupled to an AC power service to indicate that it is available for protecting against harmful disturbances on the AC power line.

TABLE A

| Component | Type/Rating |
|---|---|
| FUSE 31 | MINI, UL. CA |
|  | 4 A/250 V |
| FUSE 36 | Thermal |
|  | 4 A/100° C. |
|  | 520-0005 |
| MOV 32 | ERZV14D471 |
|  | 125 J, 300 Vrms |
| MOV 41 | ERZV20D201 |
|  | 100 J, 130 Vrms |
| Diodes 52, 53 and 54 | IA, 1000 V, SMA |
| Zener Diode 49 | 6.8 V, 225 MW SMD |
| Zener Diode 51 | 9.1 V, 225 W SMD |
| Capacitor C1 | AL, ELECT, 85 c |
| (a) | 10 uf, 100 V |
| (b) | 10 uf, 100 V |
| (c) | 10 uf, 100 V |
| Capacitor C2 | 10 uf, 100 V |
|  | AL, ELECT, 85 c |
| Capacitor C3 | 22 uf, 25 V |
|  | C 6 – 3 × 4 – 5 |
| LED 60 | Green |
|  | R/A PCMNT |
| R1 | Resistor |
| a | 1.2 kΩ 1 W, 5% RC2512 |
| b | 1.2 kΩ 1 W, 5% RC2512 |
| c | 1.2 kΩ 1 W, 5% RC2512 |
|  | Σ = 3.6 kΩ |
| R2 |  |
| a | 470 kΩ, ⅛W, 5%, RC1206 |
| b | 470 kΩ, ⅛W, 5%, RC1206 |
| c | 470 kΩ, ⅛W, 5%, RC1206 |
|  | Σ = 1.41 MΩ |
| R3 |  |
| a | 10 kΩ, 5%, 1W, RAD, RES, MOF |
| b | 10 kΩ, 5%, 1W, RAD, RES, MOF |
| c | 10 kΩ, 5%, 1W, RAD, RES, MOF |
|  | Σ = 30 kΩ |
| R4 | 30 kΩ, ¼W, 5% |
|  | RC2010 |
| R5 | 7.5 kΩ, ⅛W, 5% |
| R6 |  |
| a | 56 kΩ, 1 W, 5%, RC2512 |
| b | 56 kΩ, 1 W, 5%, RC2512 |
| c | 56 kΩ, 1 W, 5%, RC2512 |
| R7 | 56 Ω, ⅛W, 5% |
|  | RC 1206 |
| R8 | 110 kΩ, ⅛W, 5% |
|  | RC 1206 |
| R9 | 68 kΩ, ⅛W, 5% |
|  | RC1206 |
| R10 | 2.7 kΩ, ⅛W, 5% |
|  | RC1206 |
| Relay 38 | 48 Vdc Coil |
|  | 120 V/10 A |
| Transistor 43 | MMBTA42LTI |
|  | Motorola |
| Transistor 44 | FMMT458 |
|  | Zetex |

What I claim is:

1. A universal surge protector for protecting a portable notebook computer ("notebook") and an associated power adapter from harmful electrical disturbances occurring on an alternating current ("AC") power line when the notebook is powered by a direct current ("dc") battery voltage generated by a power adapter while coupled to an AC power service over the line and neutral sides of an AC power line, the surge protector comprising in combination
a higher rated voltage and current diverting and absorbing semiconductor device ("diverting and absorbing device") coupled across the line and neutral sides of an AC power line for protecting a notebook and a power adapter from harmful electrical disturbances while the surge protector is coupled to a higher rated AC power service by an AC power line,
a lower rated diverting and absorbing device for diverting harmful electrical disturbances from a notebook and a power adapter and
a switch for coupling the lower rated diverting and absorbing device across the line and neutral sides on an AC powerline in parallel with the higher rated diverting and absorbing device for protecting a notebook and power adapter from harmful electrical disturbances while the surge protector is coupled to a lower rated AC power service by an AC power line.

2. The surge protector of claim 1 wherein the higher and lower diverting and absorbing devices include metal oxide varistors ("MOVs").

3. The surge protector of claim 1 wherein the diverting and absorbing devices include transorbs.

4. The surge protector of claim 1 wherein the diverting and absorbing devices include sidactors.

5. The surge protector of claim 1 wherein the switch couples the lower rated diverting and absorbing device across an AC power line while the AC power line is coupled to a lower rated AC power source and dc-couples the lower rated diverting and absorbing device from across the AC power line while the AC power line is coupled to a higher rated AC power service.

6. The surge protector of claim 5 wherein the switch includes a switching circuit responsive to voltages of a lower rated AC power service to couple the lower rated diverting and absorbing device across an AC power line and responsive to voltages of a higher rated AC power service to dc-couple the lower rated diverting and absorbing device from across an AC power line.

7. The surge protector of claim 1 wherein the lower rated diverting and absorbing device protects the notebook and power adapter from harmful electrical disturbances while coupled to an AC power service rated from about 100 to about 120 VAC.

8. The surge protector of claim 1 wherein the lower rated absorbing and diverting device is coupled between the lower rated diverting and absorbing device and a protected notebook and power adapter.

9. The surge protector of claim 1 wherein the lower rated absorbing and diverting device is coupled between the higher rated diverting and absorbing device and a protected notebook and a power adapter.

10. The surge protector of claim 1 wherein the switch includes an electro-mechanical relay including a moveable conductive contact having a closed circuit position for coupling the lower rated diverting and absorbing device across the line and neutral sides of an AC power line while coupled to a low rated AC power service for enabling the lower rated and the higher rated diverting and absorbing devices to divert harmful electrical disturbances away from a notebook and power adapter.

11. The surge protector of claim 1 wherein the switch includes an electro-mechanical relay including a moveable conductive contact having an open circuit position for de-coupling the lower rated diverting and absorbing device from across the line and neutral sides of an AC power line when coupled to a high rated AC power service leaving the high rated diverting and absorbing device to divert harmful electrical disturbances away from a notebook and power adapter.

12. The surge protector of claim 1 wherein the switch includes an electro-mechanical relay having a moveable conductive portion having a closed circuit switch position for coupling the lower rated diverting and absorbing device across the line and neutral sides of an AC power line for the high and low rated diverting and absorbing devices to divert harmful electrical disturbances away from a notebook and power adapter while the surge protector is coupled to a low rated AC power service and the relay having a moveable conductive portion having an open circuit position for decoupling the lower rated diverting and absorbing device from across the line and neutral sides of an AC power for the high rated diverting and absorbing device to divert harmful electrical disturbances away form a notebook and power adapter while the surge protector is coupled to high rated AC power service.

13. The surge protector of claim 12 wherein the switch further includes a first transistor coupled to the relay
for switching the moveable conductive portion of the relay to its closed circuit position when the first transistor is turned ON when the surge protector is coupled to a low rated AC power service and
for switching the moveable conductive portion of the relay to its open circuit position when the first transistor is turned OFF when the surge protector is coupled to a high rated AC power service.

14. The surge protector of claim 13 wherein the switch further includes a second transistor coupled to the first transistor for preventing the first transistor from turning ON to move the conductive portion of the relay to its closed circuit position when the surge protector is coupled over an AC power line to the high rated AC power service.

15. A universal surge protector for the protection of notebook computers and associated power adapters from harmful electrical disturbances comprising in combination
a first MOV having a clamping voltage at about 775 VAC and an energy absorption rating at about 125 joules,
a second MOV having a clamping voltage at about 330 VAC and an energy absorption rating at about 100 joules and
a switching circuit including an electrically operated switch for coupling the second MOV across an AC power line in parallel with the first MOV while an AC power line is coupled to an AC power service rated from about 100 VAC to about 120 MAC and for de-coupling the second MOV from an AC power line while an AC power line is coupled to an AC power service rated from about 100 to about 120 VAC,
the effective clamping voltage of the surge protector, while the first and second MOVs are coupled to an AC power service rated from 100 to 120 VAC, being at about 300 VAC and the let-through voltage of the surge protector being at about 131 MAC when the surge protector is subjected to a 6000 VAC, 500 amp, 100 kHz category B combination surge.

16. A universal surge protector for protecting a battery powered notebook computer and an associated power adapter from harmful electrical disturbances occurring on an AC power line while the notebook is powered by a dc voltage generated by a power adapter coupled to an AC power source over the line and neutral sides of an AC power line, the surge protector comprising in combination a high voltage section for coupling to the line and neutral sides of an AC power line and including a high voltage rated MOV fixedly coupled across line and neutral for diverting harmful electrical disturbances away from a notebook and power adapter through the high voltage rated MOV when an AC power line is coupled to a high rated AC power service over an AC power line and a low voltage section for coupling to the line and neutral sides of an AC power line including a low voltage rated MOV and a switch for coupling the low voltage rated MOV in parallel with the high voltage rated MOV for diverting harmful electrical disturbances away from a notebook and power adapter through the high and low voltage MOVs while the surge protector is coupled to a lower rated AC power service and for dc-coupling the low voltage rated MOV from an AC power line when the surge protector is coupled to a high voltage rated AC power service.

17. The surge protector of claim 16 wherein the first section further includes a slow acting fuse coupled to the line side of an AC power line for protecting the notebook, power adapter and surge protector form a short circuit occurring across an AC power line while the line is coupled to an AC power service.

18. The surge protector of claim 16 wherein the second section further includes a thermal fuse coupled to the line side of an AC power line for protecting a notebook and power adapter from a thermal run-away circuit occurring at the low voltage MOV.

19. The surge protector of claim 1 further comprising an indicator to indicate connection of the surge protector to an AC power service.

20. The surge protection of claim 19 wherein the indicator includes a light emitting diode.

* * * * *